(12) United States Patent
Farkhan

(10) Patent No.: US 6,293,762 B1
(45) Date of Patent: Sep. 25, 2001

(54) METHODS FOR SEALING A TIRE AND FOR INTRODUCING LIQUID INTO A TIRE

(76) Inventor: Hormoz Farkhan, 2278 Cartbridge Rd., Falls Church, VA (US) 22043

( * ) Notice: Subject to any disclaimer, the term of this patent is extended or adjusted under 35 U.S.C. 154(b) by 0 days.

(21) Appl. No.: 09/296,973

(22) Filed: Apr. 22, 1999

(51) Int. Cl.[7] ............................ F04B 53/00; F04B 19/24
(52) U.S. Cl. .............................................. 417/234; 417/53
(58) Field of Search ................................ 417/53, 63, 36, 417/477, 234; 222/608, 214

(56) References Cited

U.S. PATENT DOCUMENTS

| | | | |
|---|---|---|---|
| 2,662,666 | * 12/1953 | Lamport | 222/181 |
| 2,752,860 | 7/1956 | Waldin | 103/149 |
| 3,043,348 | * 7/1962 | Wellsch | 141/38 |
| 3,233,553 | 2/1966 | Chanton | 103/149 |
| 3,729,033 | * 4/1973 | Bayerkohler | 141/231 |
| 4,182,491 | * 1/1980 | Parke et al. | 239/11 |
| 4,308,766 | * 1/1982 | Myers | 81/15.6 |
| 4,545,745 | 10/1985 | Barreca | 417/477 |
| 4,715,786 | * 12/1987 | Wolff et al. | 417/22 |
| 4,735,558 | 4/1988 | Keinholz et al. | 417/477 |
| 4,787,827 | * 11/1988 | Hinkle et al. | 417/234 |
| 4,951,849 | * 8/1990 | Townsend et al. | 222/523 |
| 5,070,917 | * 12/1991 | Ferris et al. | 141/38 |
| 5,263,830 | 11/1993 | Goi et al. | 417/474 |
| 5,660,529 | 8/1997 | Hill | 417/53 |
| 5,791,881 | 8/1998 | Moubayed et al. | 417/63 |

\* cited by examiner

Primary Examiner—Timothy S. Thorpe
Assistant Examiner—Timothy P. Solak
(74) Attorney, Agent, or Firm—Parsons & Goltry; Michael W. Goltry; Robert A. Parsons

(57) ABSTRACT

A method of introducing sealing liquid into a tire, the tire having a valve stem, the method comprising the steps of coupling the valve stem to a sealing liquid source in liquid communication with a line, providing a peristaltic pump in the line for pulling sealing liquid through the line from the sealing liquid source and pushing the sealing liquid through the line to the tire.

13 Claims, 4 Drawing Sheets

METHODS FOR SEALING A TIRE AND FOR INTRODUCING LIQUID INTO A TIRE

FIELD OF THE INVENTION

This invention relates generally to the field of tires and, more particularly, to methods of introducing liquid into a tire.

BACKGROUND OF THE INVENTION

To inhibit a tube or tubeless tire from flattening when punctured or when leaks form, the prior art provides a wide variety of liquid sealants. These liquid sealants are normally introduced into the cavity of the tire and prove exemplary for sealing small leaks and punctures that could otherwise cause the tire to flatten. Skilled artisans have devoted considerable attention toward apparatus and methods for introducing sealing liquids into a tire in deflated and inflated conditions. Many of these sealing liquids for tires contain solids, such as fibers, to help in the sealing process. These solids have an adverse affect on many pumping systems. The solids can clog the check valves and collect in areas of the pump chamber thereby making the dosage per pump cycle inaccurate. Thus, the solids require frequent cleaning of the pump system. In addition, the pump systems experience wear during use. The amount of wear will vary with the type of pump system. Thus, the best pump system for a fiber filled sealing liquid would be easily cleaned and/or replaced.

Accordingly, it would be highly desirable to provide improved methods for introducing a sealing liquid or other liquids such as a lubricant, a coolant, a balancing liquid, a ballast liquid or any other liquid into a tire in an inflated or pressurized condition all the way down to a non-pressurized condition.

It is a purpose of the present invention to provide a new and improved method for introducing a liquid into a tire in an inflated or pressurized condition that is easy and inexpensive to implement.

It is another purpose of the present invention to provide a new and improved method for introducing a liquid into a tire in an inflated or pressurized condition that is highly efficient.

It is still another purpose of the present invention to provide a new and improved method for introducing a liquid into a tire in an inflated or pressurized condition with an apparatus that is easy and inexpensive to construct.

It is a further purpose of the present invention to provide a new and improved method for introducing a liquid into a tire in an inflated or pressurized condition that utilizes peristaltic movement of liquid.

It is still a further provision of the present invention to decrease the frustration commonly associated with existing methods of introducing a liquid into a tire in an inflated or pressurized condition.

It is yet still a further provision of the present invention to provide a new and improved method for introducing a liquid into a tire in an inflated or pressurized condition that utilizes a device that has no check valves, gears or other parts that can be clogged by fibers present in most liquids.

It is another purpose of the present invention to provide a new and improved method for introducing a liquid into a tire in an inflated or pressurized condition that utilizes a self-contained device that can be easily moved and that can deliver liquid against pressures.

It is still another purpose of the present invention to provide a new and improved method for introducing a liquid into a tire in an inflated or pressurized condition that utilizes a device that is easy and inexpensive to maintain.

It is yet still another purpose of the present invention to provide a new and improved method for introducing a liquid into a tire in an inflated or pressurized condition that is highly reliable and exemplary for delivery very accurate dosages of liquid.

SUMMARY OF THE INVENTION

The above problems and others are at least partially solved and the above purposes and others are realized in new and improved apparatus and methods for introducing liquid into a tire in a pressurized condition all the way down to a non-pressurized condition. In a particular embodiment, a preferred method for the present invention comprises the steps of coupling the tire to a liquid source in liquid communication with a pump and moving the liquid by peristaltic movement for pulling liquid through the pump and pushing the liquid into the tire.

BRIEF DESCRIPTION OF THE DRAWINGS

The foregoing and further and more specific objects and advantages of the instant invention will become readily apparent to those skilled in the art from the following detailed description thereof taken in conjunction with the drawings in which.

DETAILED DESCRIPTION OF A PREFERRED EMBODIMENT

The present invention provides, among other things, new and improved apparatus and methods for introducing liquid, such as a sealing liquid, into a tire in a pumped-up, inflated or pressurized condition. Ensuing embodiments of the present invention are easy and inexpensive to implement and prove especially efficient for moving sealing liquid against a pressurized tire. In the interests of illustrating conventional apparatus and methods of introducing or moving sealing liquid into a tire through a valve stem, U.S. Pat. No. 4,308,766 to Meyers, Jr., entitled LIQUID TIRE SEALANT INJECTION TOOL granted Jan. 5, 1982, and U.S. Pat. No. 2,656,083 to Blomgren entitled TIRE ADAPTER granted Oct. 20, 1953, are each expressly incorporated by reference herein.

Figure 1:
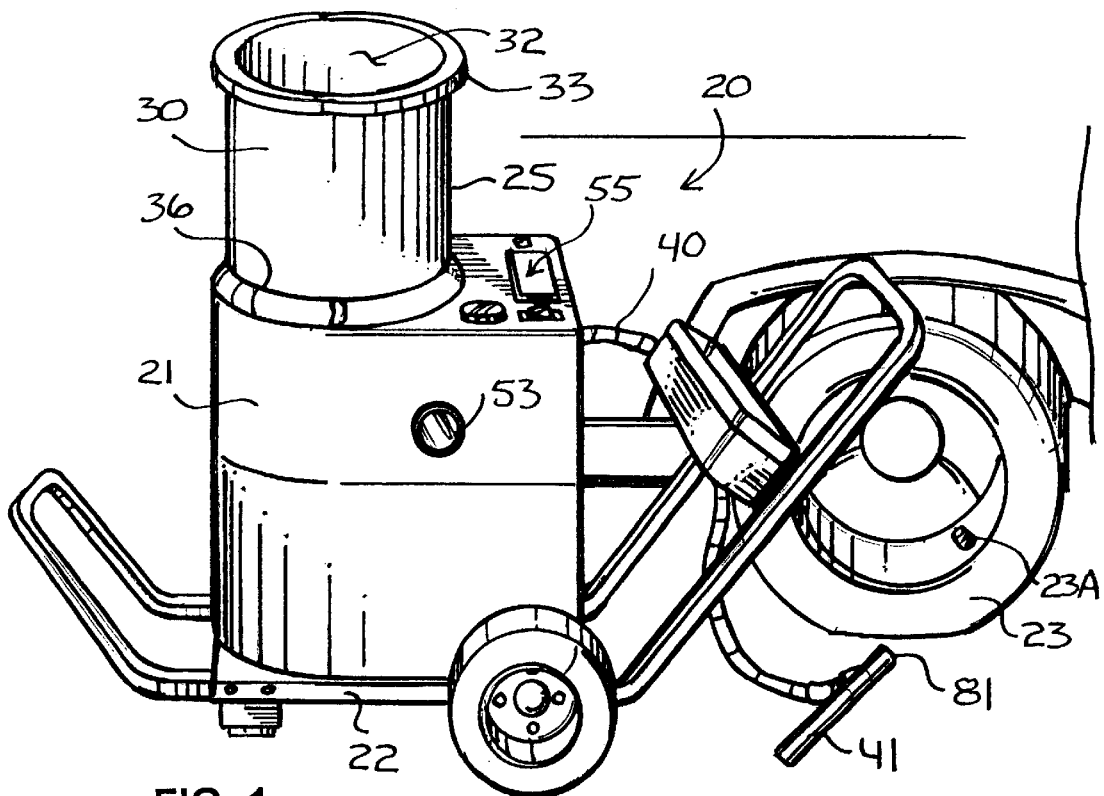
FIG. 1 is a perspective view of apparatus useful in methods for introducing liquid into a tire in a pressurized condition, the apparatus including a receptacle shown as it would appear partially pulled out.
Figure 2:
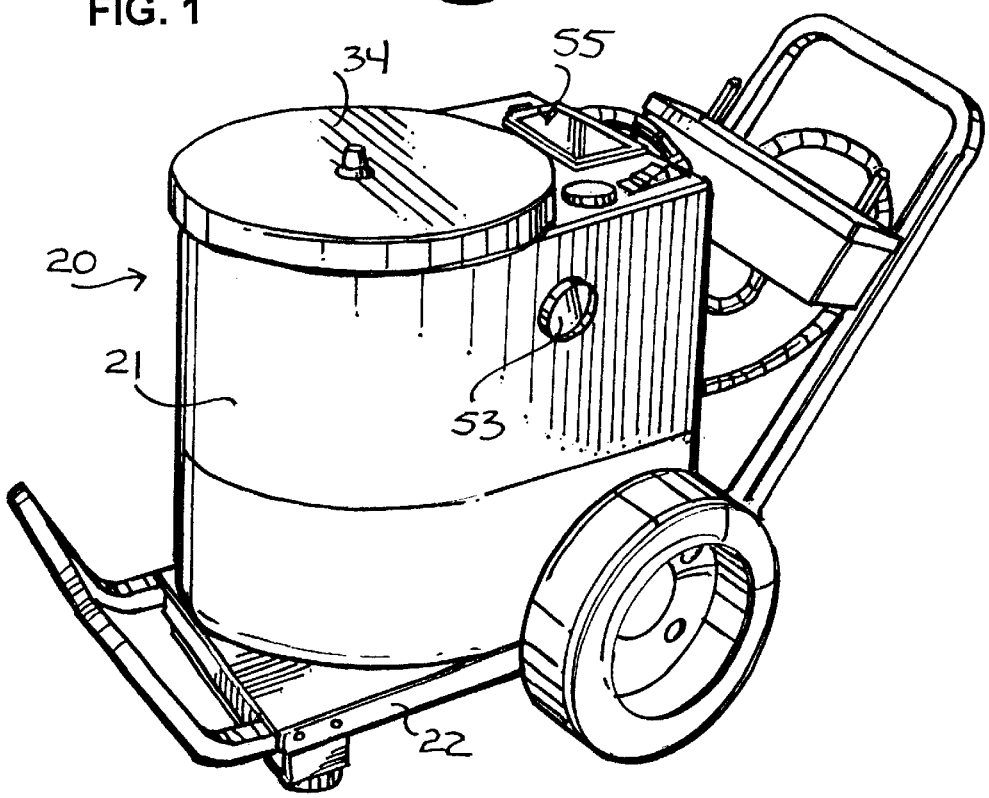
FIG. 2 is another perspective view of the apparatus of FIG. 1.

Turning now to the drawings, in which like reference characters indicate corresponding elements throughout the several views, attention is first directed to FIGS. 1 and 2 which illustrate perspective views of apparatus 20 useful in methods for introducing sealing liquid into a tire 23 in a pressurized condition. Apparatus 20 is self-contained and is generally comprised of a housing 21 carried or otherwise supported by a wheeled chassis 22, and is normally employed for containing and introducing sealing liquid into a tube or tubeless tire 23 in a pressurized to non-pressurized condition. Like conventional tubes and tubeless tires, tire 23 includes a conventional valve stem 23A.

Figure 3:
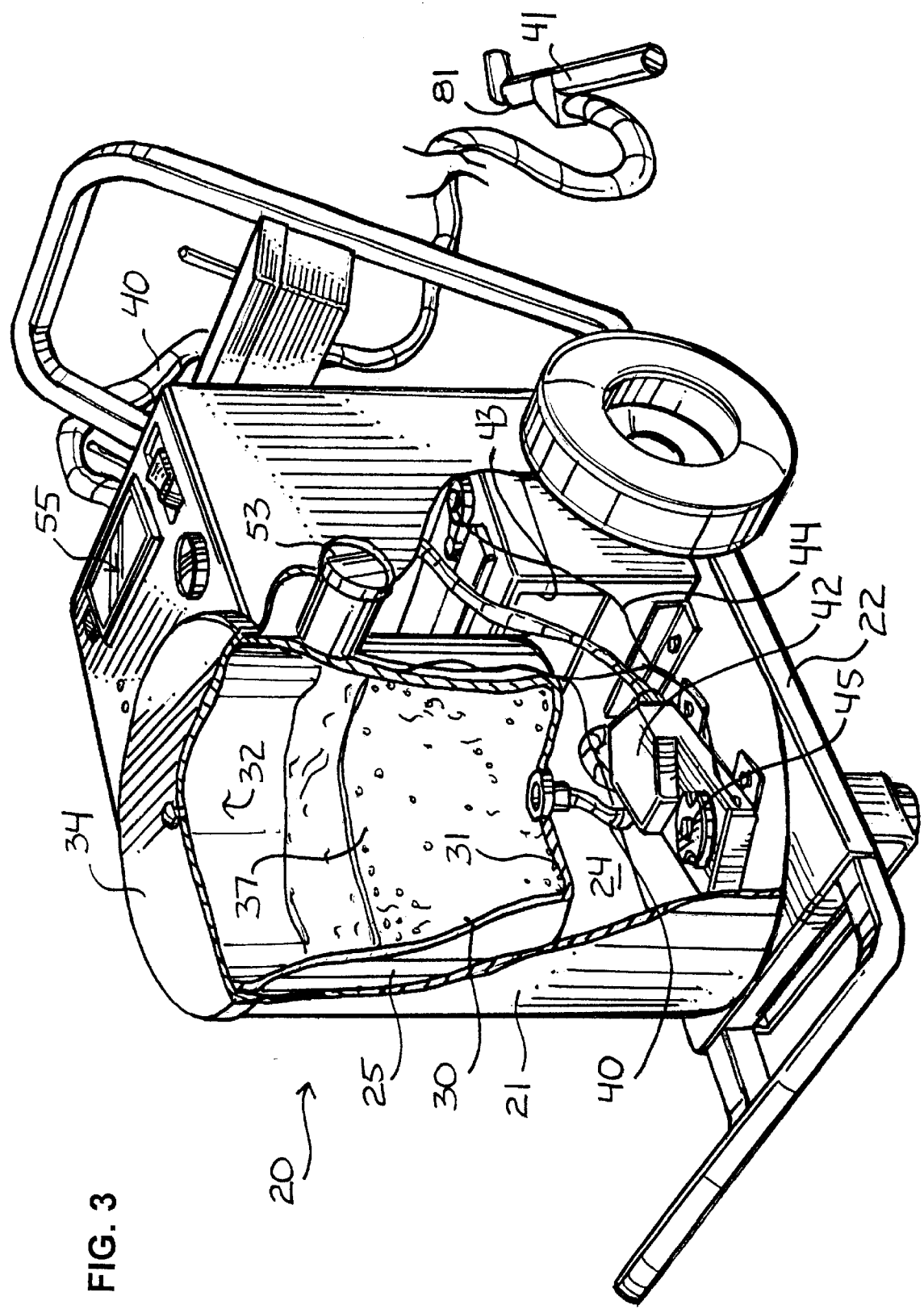
FIG. 3 is a perspective view of the apparatus of FIG. 1 with portions thereof broken away for the purposes of illustration, the apparatus including a wheeled chassis, a source of liquid and a pump for pulling liquid from the liquid source along a line and for pushing the liquid along the line toward a tool.

Turning to FIG. 3, housing 21 bounds a chamber 24 and supports a receptacle 25 in chamber 24. Receptacle 25 includes a continuous sidewall 30 having a closed end 31, an open end 32 having an outwardly extending annular flange 33 (shown in FIG. 1) and a lid 34 removably engagable for enclosing open end 32. Looking to FIG. 1, receptacle 25 is receivable into chamber 24 (shown in FIG. 3) through an opening 36 formed through housing 21. Annular flange 33 defines a diameter somewhat greater than the diameter of opening 36 and thus rests against portions of housing 21 bounding opening 36. Regarding FIG. 3, receptacle 25 is operative for receiving and normally containing a conventional sealing liquid 37 and is considered to be a source of sealing liquid.

With continuing attention to FIG. 3, a line 40 leads from closed end 31 into and through chamber 24 and outwardly from housing 21 terminating with a tool 41. Line 40 comprises a flexible conduit able to take high pressures interconnecting receptacle 25 with tool 41 in sealing liquid communication. Line 40 is preferably constructed of urethane or other material having similar functional characteristics. A pump 42 carried by housing 21 adjacent closed end 31 engages line 40 intermediate closed end 32 and tool 41. In this embodiment, pump 42 comprises a conventional electrically motorized peristaltic pump that, when actuated, imparts peristaltic movement to line 40 to cause line 40 to pull sealing liquid 37 therethrough from receptacle 25 and push it therethrough to tool 41. The term peristaltic pump is meant to encompass pumps that have a flexible conduit, bladder or liner which is moved by one or more pumping members so that a portion of the fluid to be pumped is trapped by the conduit, bladder or liner and moved by the pumping member. The following patents are each expressly incorporated by reference herein to provide a disclosure of some of the pumps which should be considered to be peristaltic pumps under the above definition: U.S. Pat. No. 4,545,745 to Barreca for a PERISTALTIC PUMP granted Oct. 8, 1985; U.S. Pat. No. 4,735,558 to Kienholz et al for a PERISTALTIC PUMP LATCHING MECHANISM granted Apr. 5, 1988; U.S. Pat. No. 5,660,529 to Hill for a LINEAR PERISTALTIC PUMP WITH RESHAPING FINGERS INTERDIGITATED WITH PUMPING ELEMENTS granted Aug. 26, 1997; U.S. Pat. No. 5,263,830 to Goi et al for a PERISTALTIC PUMP ASSEMBLY granted Nov. 23, 1993; U.S. Pat. No. 5,791,881 to Moubayed for a CURVILINEAR PERISTALTIC PUMP WITH OCCLUSION DETECTION MEANS granted Aug. 11, 1998; U.S. Pat. No. 2,752,860 to Waldin for a PUMP granted Jul. 3, 1956; U.S. Pat. No. 3,233,553 to Chanton for PUMPS granted Feb. 8, 1966; Vanton FLEX-I-LINER™ Sealess Self-priming Plastic Pumps, Catalog 10.02, 1994, Vanton Pump and Equipment Corp., 201 Sweetland Ave., Hillside, N.J. 07205; and TAT Industrial Pumps, Catalog F, TAT Pumps, P.O. Box 268, Logan, Ohio 43138. Like some peristaltic pumps, pump 42 includes a shaft 45 that rotates during operation, wherein each rotation corresponds to a quantity of sealing liquid passing through the portion of line 40 extending through pump 42. To supply electrical energy to pump 42, housing 21 further contains a battery 43 coupled in electrical communication with pump 42 via electrical interconnection 44. Battery 43 may comprise rechargeable 12 volt automotive or marine battery, etc.

Figure 4:
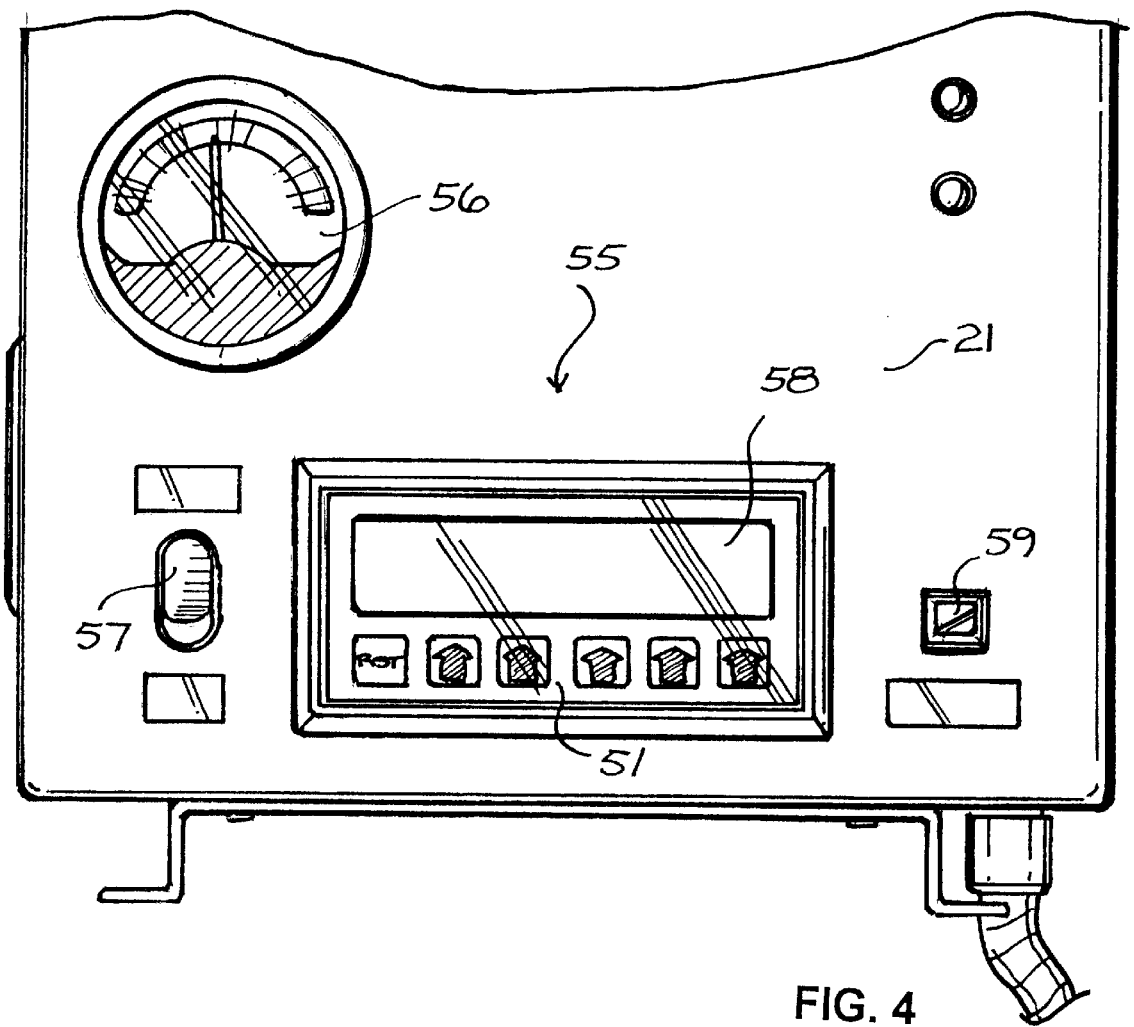
FIG. 4 is a top elevational view of a control panel of the apparatus of FIG. 1.
Figure 5:
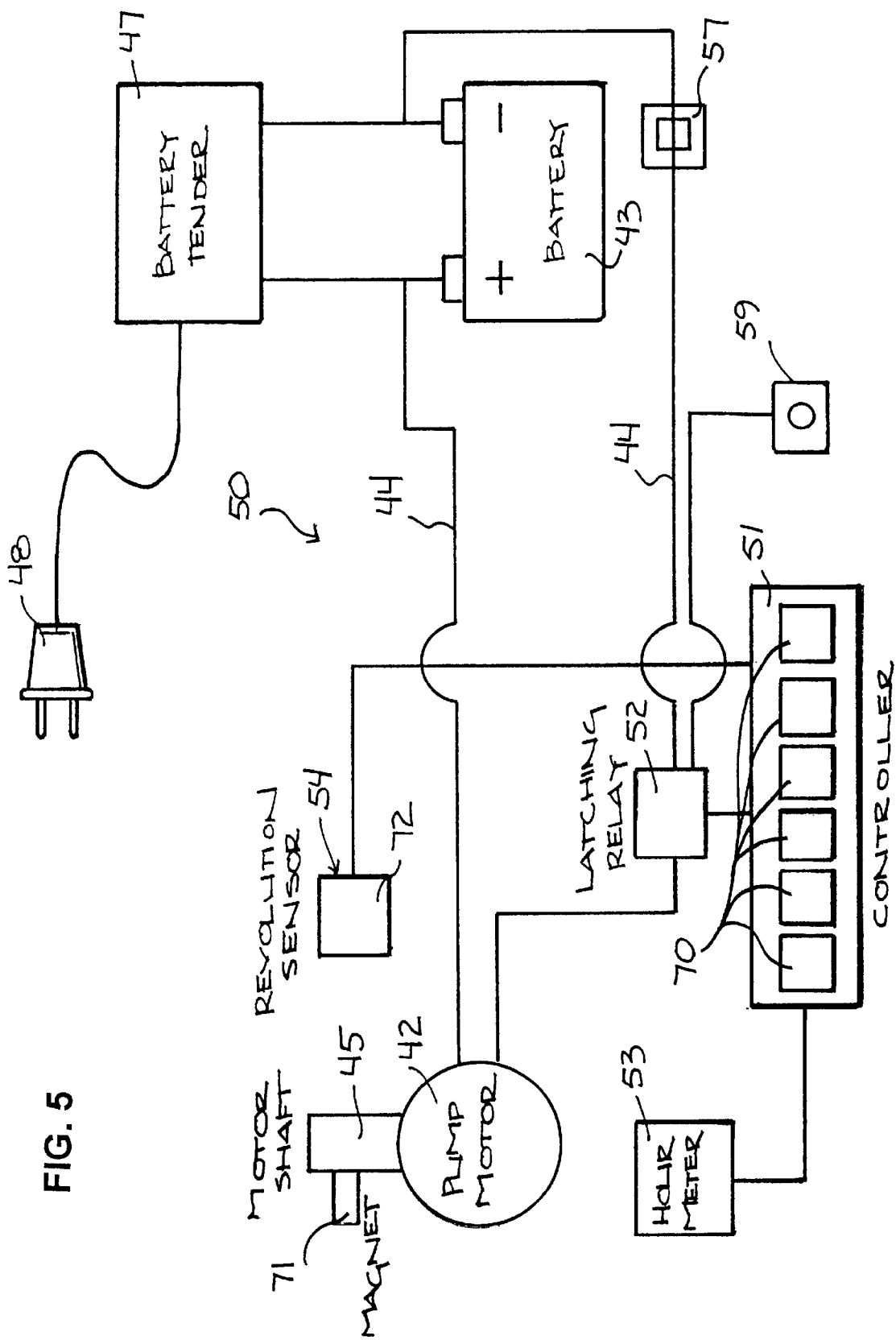
FIG. 5 is a schematic representation of a controller assembly for operating the apparatus of FIG. 1.

To actuate and operate pump 40 for peristaltically moving sealing liquid from receptacle 25 to tool 41, FIG. 5 illustrates a schematic representation of a controller assembly 50. Controller assembly 50 comprises a controller/counter 51 coupled to a conventional latching relay 52 which is in electrical communication with battery 43 and pump 42. Battery 43 is preferably rechargeable. In this regard, battery 43 is coupled in electrical communication with a battery tender or charger 47 that is in turn coupled with a plug 48 engagable into a conventional electrical socket for allowing battery 43 to be recharged as needed. An exemplary battery tender useful in the present invention is the battery tender manufactured by Halon Mktg. USA, Inc., P.O. Box 203, Thorndale, Pa. 19372, that bears the exemplary trademark SUPERSMART™. Controller/counter 51 is also coupled in direct electrical and signal communication with rotation counter apparatus 54. As shown in FIGS. 1–4, controller/counter 51 is normally carried by housing 21 as part of a control panel 55 which may include, as best shown in FIG. 4, a gauge 56 for indicating the battery voltage, an ON/OFF toggle switch 57 for turning apparatus 20 ON and OFF, a display 58 mounted adjacent controller/counter 51 and a start pump switch 59.

With attention directed back to FIG. 5, controller/counter 51 includes conventional logic/algorithmic circuitry for allowing it to be selectively programmed and for allowing it to signal communicate with rotation counter apparatus 54 and relay 52. Controller/counter 51 further includes a series of buttons/pads and readouts 70 that, with ON/OFF toggle switch 57 in the ON position, a user may engage to control/set and monitor the operation of apparatus 20 and, namely, the operation of pump 42. Time meter 53 is a conventional device operative for tracking the operation time of pump 42. After a certain number of hours, the line 40 within the pumping area must be changed for pump maintenance. In particular, rotation counter apparatus 54 is operative for counting the revolutions of shaft 45 as it rotates during the pump's operation and for communicating the revolution counting information or data to controller/counter 51 and for display on display 58. Because each rotation of shaft 45 corresponds to a quantity or volume of sealing liquid passing through line 40, rotation counter apparatus 54 and controller/counter 51 may be used together for accurately monitoring and controlling the quantity and delivery of sealing liquid. In this specific embodiment, rotation counter apparatus 54 comprises a conventional magnetic 71 fixed to shaft 45 and a sensor 72 mounted adjacent shaft 45 in substantial opposition to magnet 71. Magnet 71 may be fixed to shaft with screws or other suitable fastener. As magnet 71 spins with the rotation of shaft 45, sensor 72 senses magnet 71 as it passes by. The sensor 72 is coupled in electrical and signal communication with controller/counter 51 and communicates the data of the number of times magnet 71 passes by to controller/counter 51.

In operation, a user may couple tool 41 in liquid communication with valve stem 23A (FIG. 1). The valve core is retracted by tool 41 in a manner like the valve core extraction shown in FIG. 5 of U.S. Pat. No. 4,308,766. Outlet 81 is coupled with valve stem 23A in sealing liquid communication. When the switch 57 is placed in the ON position, power from the battery 43 is provided to controller/counter 51 and other electrical elements of the system. Next, the controller/counter 51 has the number of revolutions or ounces for the desired dose input by using the buttons or pads at 70. Then, after the tool 41 has been placed on the tire stem, pump start button 59 is pressed momentarily. The pump start button 59 applies power to the latching relay, which moves the relay/switch 52 to the latched or closed position. Next, the closing of relay 52 applies power to the motor of pump 42, and the pump 42 moves the liquid in the receptacle into the tire until the controller/counter 51 communicates with the latching relay and causes it to unlatch and move to the open position thereby stopping the pump 42. While power is supplied to the motor of pump 42, the time meter 53 is running, and the time is being recorded.

Because sealing liquid 37 contacts only receptacle 25, line 40 and tool 41, apparatus 20 is very easy to clean and maintain. In fact, experimentation has shown that apparatus 20 can be operated for as much as 500 hours, as measured by time meter 53, before it needs to be maintained. This maintenance normally only includes the removal and replacement of line 40 within the pumping area.

The present invention has been described above with reference to a preferred embodiment. However, those skilled in the art will recognize that changes and modifications may be made in the described embodiments without departing from the nature and scope of the present invention. For instance, the pump can be powered by an AC motor, an air motor, a hydraulic motor or by manual power. The tire can be fully pressurized or at any pressure including fully deflated. The liquid can be a sealant, a lubricant, a coolant, a balancing liquid, a ballast liquid such as calcium chloride and water or alcohol and water, a liquid that turns to foam or other liquid used in tires. The tool that is used to introduce the liquid to the tire may be other than that disclosed by Meyers, Jr., and can be multiple or interchangeable tools. The tire can be off of the rim, and the liquid can be introduced through the opening between the sides. The tire can be on the rim, and the liquid inserted through the tire wall by a puncturing tool. There can be a pressure relief valve in the liquid line downstream of the pump to prevent the line from rupturing in an overpressure situation. The pressure relief valve should be in an area in which any liquid issuing therefrom can be detected by sight.

The present invention can also be used with other automotive liquids that are not used in tires. Such a fluid could be a lubricant, a motor oil, a light grease, a power steering fluid, a transmission fluid, a differential gear oil, a brake fluid, a windshield washer fluid or other automotive fluid.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method for introducing a dosage of sealing liquid into a tire, the tire having a valve stem, the method comprising the steps of:
    coupling a sealing liquid source to the valve stem in sealing liquid communication with a line;
    providing a control assembly;
    providing a motorized peristaltic pump;
    connecting the motorized peristaltic pump in signal communication with the control assembly;
    inputting a dosage of sealing liquid into the control assembly;
    actuating the pump to pump the dosage of sealing liquid to the tire through the valve stem in response to actuation of the control assembly; and
    stopping the pump when the controller counts the dosage delivered to the tire.

2. The method of claim 1, wherein the step of providing a control assembly further comprises the steps of:
    providing a controller; and
    providing measuring apparatus for measuring and communicating the quantity of sealing liquid pumped by the motorized peristaltic pump to the controller.

3. The method of claim 2, the motorized peristaltic pump having a shaft that rotates during pumping, wherein each rotation corresponds to a quantity of pumped sealing liquid, wherein the step of providing measuring apparatus further includes the steps of:
    providing rotation counter apparatus; and
    mounting the rotation counter apparatus in counting relation with the shaft.

4. The method of claim 3, wherein the steps of providing rotation counter apparatus and mounting the rotation counter apparatus in counting relation with the shaft further include the steps of:
    fixing a magnet to the shaft; and
    mounting a sensor adjacent the shaft in substantial opposition to the magnet.

5. The method of claim 1, further including the step of providing an electrical power source comprising a rechargeable 12 volt battery.

6. A method of introducing sealing liquid into a tire comprising the steps of:
    coupling the tire to a sealing liquid source in sealing liquid communication with a line;
    providing a peristaltic pump in the line for pulling sealing liquid through the line from the sealing liquid source and pushing the sealing liquid through the line to the tire;
    actuating the peristaltic pump; and
    measuring a quantity of sealing liquid transferred form the sealing liquid source to the tire through the line.

7. The method of claim 6, wherein the step of actuating the peristaltic pump further includes the steps of:
    providing a controller for the peristaltic; and
    actuating the controller.

8. The method of claim 7, the peristaltic pump having a shaft that rotates during actuation thereof, wherein each rotation corresponds to a quantity of pumped sealing liquid, wherein the step of measuring a quantity of pumped sealing liquid further includes the step of counting revolutions of the shaft.

9. The method of claim 8, wherein the step of counting revolutions of the shaft further includes the steps of:
    providing magnet on the shaft; and
    counting the revolutions with a sensor.

10. A method of introducing liquid into a tire, the tire having a valve stem, the method comprising the steps of:
    coupling the valve stem to a liquid source in liquid communication with a line;
    providing a peristaltic pump in the line for pulling liquid through the line from the liquid source and pushing the liquid through the line to the tire;
    actuating the peristaltic pump; and
    measuring a quantity of liquid transferred from the liquid source to the tire through the line.

11. The method of claim 10, wherein the step of actuating the peristaltic pump further includes the steps of:
    providing a controller for the peristaltic pump; and
    actuating the controller.

12. The method of claim 11, the peristaltic pump having a shaft that rotates during actuation thereof, wherein each rotation corresponds to a quantity of pumped liquid, wherein the step of measuring a quantity of pumped liquid further includes the step of counting revolutions of the shaft.

13. The method of claim 12, wherein the step of counting revolutions of the shaft further includes the steps of:
    providing magnet on the shaft; and
    counting the revolutions with a sensor.

\* \* \* \* \*